US009071441B2

(12) United States Patent
Ross et al.

(10) Patent No.: US 9,071,441 B2
(45) Date of Patent: Jun. 30, 2015

(54) IDENTIFICATION AND AUTHORIZATION OF COMMUNICATION DEVICES

(75) Inventors: Mark A. Ross, San Carlos, CA (US); David J. Mooring, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 822 days.

(21) Appl. No.: 12/651,952

(22) Filed: Jan. 4, 2010

(65) Prior Publication Data

US 2011/0167262 A1    Jul. 7, 2011

(51) Int. Cl.
*H04L 9/32* (2006.01)
*H04W 12/06* (2009.01)
*G06F 21/44* (2013.01)

(52) U.S. Cl.
CPC ............ *H04L 9/3247* (2013.01); *G06F 21/445* (2013.01); *H04W 12/06* (2013.01); *H04L 2209/80* (2013.01)

(58) Field of Classification Search
CPC .............. H04L 9/3281; H04L 63/0428; H04L 63/0823; H04L 9/32; H04L 63/08; H04L 63/0869; H04L 12/06; H04L 9/08; H04L 9/3271; H04L 67/04; H04L 2209/80; G06Q 20/341; G06Q 20/32; H04W 12/02; H04W 12/06; H04W 12/04; H04W 12/12; H04W 12/08; H04W 88/02; H04W 48/16; H04W 48/20; G08C 2201/91; H04R 2205/021; H04R 2420/07; G06F 21/445; G06F 2221/2129
USPC ........... 726/2, 3; 713/168–170; 455/410, 411; 380/270, 255
See application file for complete search history.

(56) References Cited

U.S. PATENT DOCUMENTS

| | | | |
|---|---|---|---|
| 6,711,414 B1 | 3/2004 | Lightman et al. | |
| 7,606,560 B2 | 10/2009 | Labrou et al. | |
| 7,783,981 B2 * | 8/2010 | Tyhurst | 715/744 |
| 8,086,332 B2 * | 12/2011 | Dorogusker et al. | 700/94 |
| 2003/0162562 A1 * | 8/2003 | Curtiss et al. | 455/556 |
| 2005/0200453 A1 | 9/2005 | Turner et al. | |
| 2006/0126846 A1 | 6/2006 | Araki | |
| 2006/0156415 A1 * | 7/2006 | Rubinstein et al. | 726/27 |
| 2006/0172734 A1 | 8/2006 | Tak | |
| 2006/0255963 A1 * | 11/2006 | Thompson et al. | 340/825.69 |
| 2007/0080823 A1 * | 4/2007 | Fu et al. | 340/825.22 |
| 2007/0129112 A1 * | 6/2007 | Tarn | 455/566 |
| 2009/0081996 A1 | 3/2009 | Duggal et al. | |
| 2009/0094681 A1 | 4/2009 | Sadler et al. | |

FOREIGN PATENT DOCUMENTS

WO    2005117527 A2    12/2005
WO    2007100989 A2    9/2007

OTHER PUBLICATIONS

PCT International Search Report and Written Opinion for the International Searching Authority, issued Aug. 29, 2011, Application No. PCT/US2010/061847.

* cited by examiner

*Primary Examiner* — Nirav B Patel
(74) *Attorney, Agent, or Firm* — Morris & Kamlay LLP

(57) ABSTRACT

A method implemented by a wearable wireless communication device ("WWCD") includes detecting a connection between the WWCD and an accessory device. The WWCD accesses a memory location in the accessory device, the memory location being designated for storing brand data indicating a brand identity associated with the accessory device. The WWCD determines a brand status of the accessory device based on data, if any, accessed from the memory location in the accessory device. The WWCD also determines one or more interactions permitted between the WWCD and the accessory device based at least in part on the brand status of the accessory device.

14 Claims, 8 Drawing Sheets

IDENTIFICATION AND AUTHORIZATION OF COMMUNICATION DEVICES

BACKGROUND

1. Field of the Invention

The present invention relates to wireless devices. More particularly, some embodiments relate to a wearable wireless communication device ("WWCD") configured to interact with different accessory devices.

2. Related Technology

Wireless consumer communication technologies are implemented in mobile consumer devices such as satellite receivers, personal digital assistants, cell phones, media players, watches, etc. Such consumer devices are gaining popularity across a broad spectrum of users. As these consumer devices become more prevalent, there is an increased need for interoperability of these consumer devices with other devices.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

In general, example embodiments relate to a WWCD configured to interact with different accessory devices.

In one example embodiment, a method implemented by a WWCD includes detecting a connection between the WWCD and an accessory device. The WWCD accesses a memory location in the accessory device, the memory location being designated for storing brand data indicating a brand identity associated with the accessory device. The WWCD determines a brand status of the accessory device based on data, if any, accessed from the memory location in the accessory device. The WWCD also determines one or more interactions permitted between the WWCD and the accessory device based at least in part on the brand status of the accessory device.

In another example embodiment, a method implemented by a WWCD includes detecting a connection between the WWCD and an accessory device, the WWCD being associated with a first brand identity. The WWCD accesses a memory location in the accessory device, the memory location being designated for storing data used to authenticate the accessory device. The WWCD authenticates the accessory device when data stored in the memory location includes a unique identifier encrypted by a public key that corresponds to a private key accessible to the WWCD. The WWCD identifies a second brand identity associated with the accessory device. The WWCD also enables one or more interactions between the WWCD and the accessory device based at least in part on compatibility between the first and second brand identities.

In yet another example embodiment, a method implemented by an accessory device includes detecting a connection between an accessory device associated with a brand identity and a WWCD. The accessory device determines that the WWCD is un-branded. The accessory device validates an identity of the WWCD. The accessory device temporarily transfers its brand identity to the WWCD subject to one or more usage restrictions. The accessory device determines whether the WWCD is authenticated. When the WWCD is authenticated, the accessory device maintains the transfer of its brand identity to the WWCD.

These and other aspects of example embodiments will become more fully apparent from the following description and appended claims.

BRIEF DESCRIPTION OF THE DRAWINGS

To further clarify various aspects of some embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

I. Example Operating Environment

Figure 1:
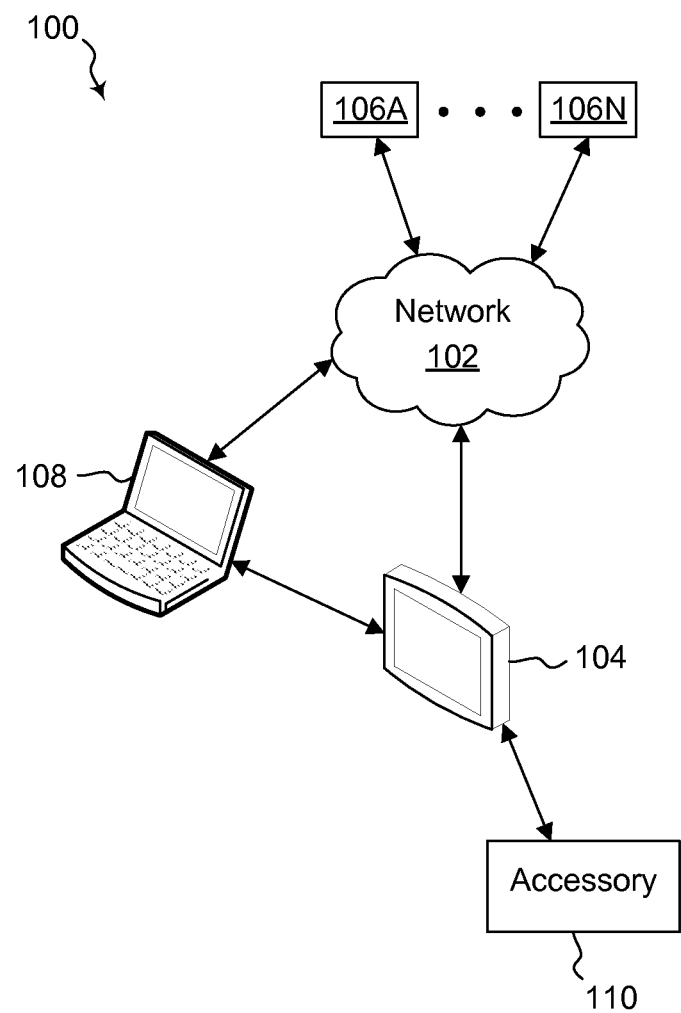
FIG. 1 illustrates an example operating environment in which some embodiments of a WWCD can be implemented.

With reference now to FIG. 1, a first example operating environment 100 is illustrated in which some embodiments can be practiced. The example operating environment 100 includes a network 102 over which a wearable wireless communication device ("WWCD") 104 communicates with and/or syncs to one or more services and/or resources 106A-106N (collectively "services/resources 106").

In some embodiments, the WWCD 104 directly accesses the network 102 to communicate with and/or sync to services/resources 106. In other embodiments, the WWCD 104 accesses the network 102 and services/resources 106 through a computing device 108. Alternately or additionally, a local connection is established between the WWCD 104 and computing device 108 for communication and/or syncing between the WWCD 104 and computing device 108.

Optionally, the WWCD 104 is configured to interact with one or more accessory devices 110 configured to receive WWCDs 104.

The network 102 is illustrated in simplified form and exemplarily includes the Internet, including a global internetwork formed by logical and physical connections between multiple wide area networks and/or local area networks. Alternately or additionally, the network 102 includes a cellular RF network and/or one or more wired and/or wireless networks such as, but not limited to, 802.xx networks, Bluetooth access points, wireless access points, IP-based networks, or the like. The network 102 also includes servers that enable one type of network to interface with another type of network.

The services/resources 106 may be any one or more of a plurality of services that include, but are not limited to, a global positioning system ("GPS") service configured to provide positioning, navigation, and/or timing services to the WWCD 104, a backup service configured to provide backup and retention of data associated with the WWCD 104, a weather service configured to provide weather reports to the WWCD 104 based on user settings and/or the location of the WWCD 104, or the like or any combination thereof The accessory device 110 includes any device configured to receive a WWCD 104. Optionally, the WWCD 104 may communicate with accessory device 110. Alternately or additionally, the WWCD 104 is configured to subordinate itself to the accessory device 110 and to permit the accessory device 110 to control an interface of the WWCD 104 and/or a radio or radios of the WWCD 104. Examples of accessory devices 110 include charging docks, clock radios, televisions, watch bands, clip-on-bands, cellular phones, smart phones, exercise equipment (e.g., treadmills, elliptical machines, etc.), bike accessories, media players, or the like or any combination thereof.

In some embodiments, one or both of the WWCD 104 or accessory device 110 is associated with a particular brand identity. Optionally, the level of interaction of one or both of the WWCD 104 or accessory device 110 with the other varies depending on compatibility between the particular brand identity, if any, associated with WWCD 104 and/or accessory device 110. For example, when the WWCD 104 and accessory device 110 are associated with the same, compatible and/or affiliated brand identities, the most extensive level of interaction of the WWCD 104 and accessory device 110 may be enabled. In contrast, when the WWCD 104 and accessory device 110 are associated with incompatible brand identities, or when the WWCD 104 is associated with a brand identity and the accessory device 110 is un-branded (e.g., not associated with any brand identity), or when the WWCD 104 is un-branded and the accessory device 110 is associated with a brand identity, or when the WWCD 104 and accessory device 110 are both un-branded, there may be a less extensive level of interaction enabled for the WWCD 104 or accessory device 110 than when the WWCD 104 and accessory device 110 are associated with the same brand identity. In some embodiments, the specific levels of interaction for the WWCD 104 or accessory device 110 under the foregoing scenarios are determined by an owner/administrator of the brand identity respectively associated with the WWCD 104 or accessory device 110.

II. Example Wearable Wireless Communication Device

Figure 2:
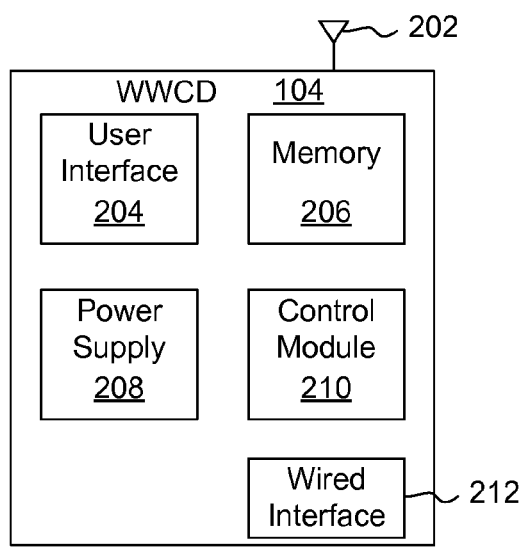
FIG. 2 is a block diagram depicting the WWCD of FIG. 1.

Turning next to FIG. 2, an example embodiment of the WWCD 104 is disclosed. FIG. 2 illustrates a block diagram of the WWCD 104 of FIG. 1. As depicted in FIG. 2, the WWCD 104 includes an antenna 202, user interface 204, memory 206, power supply 208, control module 210 and wired interface 212.

The antenna 202 is configured to send and receive wireless signals according to any one or more of a variety of wireless protocols, including, but not limited to, cellular telephony protocols, WiFi protocols, Bluetooth protocols, and the like. Accordingly, the antenna 202 enables the WWCD 104 to wirelessly connect to services/resources 106 to communicate with and/or sync to services/resources 106. Alternately or additionally, the antenna 202 enables the WWCD 104 to wireless connect to computing device 108 and/or accessory device 110.

The user interface 204 includes one or more output components and one or more input components. The output components include one or more of a display, touch-screen display, speaker, vibrating element, audio (headphone) jack, or other suitable output components. The input components include one or more of a touch-screen display, key, button, track wheel, scroll ball, microphone, or other suitable input components.

The memory 206 is a volatile or non-volatile memory source suitable for storing content received from services/resources 106, data input by a user, and/or other data. As such, the memory 206 in some embodiments includes one or more of a register, flip-flop, random access memory ("RAM"), read-only memory ("ROM"), programmable read-only memory ("PROM"), electrically erasable and programmable read-only memory ("EEPROM"), flash memory, or other suitable memory device. In some embodiments, the memory 206 permits the WWCD 104 to be used as a mass storage device by one or more of computing device 108 and/or accessory device 110.

The power supply 208 is configured to provide electrical power to operate the WWCD 104. In some embodiments, the power supply 208 is a rechargeable or single-use battery.

The control module 210 is used to, among other things, control operation of the WWCD 104. The control module 210 may be a controller, microcontroller, processor, microprocessor, other suitable computing device, or any combination thereof. The control module 210 recognizes computer-readable instructions that follow a particular instruction set and may perform normal general-purpose operations such as shifting, branching, adding, subtracting, multiplying, dividing, Boolean operations, comparison operations, and the like. The control module 210 and memory 206 may be packaged together in the same integrated circuit ("IC") package or in different IC packages without restriction.

The wired interface 212 includes one or more pins, pads, or other elements suitable for establishing a wired electrical connection to a computing device and/or accessory devices, such as the computing device 108 and accessory devices 110, respectively, of FIG. 1. In some embodiments, the wired interface 212 includes a pinout arrangement with pins for a universal serial bus ("USB")-compliant interface (version 2.0 or version 3.0) and/or for other purposes. For instance, one example of the wired interface 212 includes 4 pins providing a standard USB 2.0 interface, 1 pin providing power out and reset, 2 pins providing an I²C interface, 1 pin providing ground, 1 pin for an external antenna, and 3 pins for audio-left, audio-right and audio-ground. Another example of the wired interface 212 includes 9 pins providing a standard USB 3.0 interface, 1 pin providing power out and reset, 2 pins providing an I²C interface, 1 pin providing ground, and 1 pin for an external antenna. The wired interface 212 can include still other pinout arrangements as may be suitable for a given application. In these and other examples, the power out and reset pin is configured to provide power to one or more external devices, such as the accessory device 110 of FIG. 1 in some embodiments.

As already indicated, the WWCD 104 may implement the I²C protocol via wired interface 212 to communicate with computing device 108 and/or accessory device 110. In some embodiments, the WWCD 104 is configured to operate as an I²C slave node in connection with computing device 108 or accessory device 110 operating as an I²C master node. In other embodiments, the WWCD 104 is configured to operate as an I²C master node in connection with computing device 108 or accessory device 110 operating as an I²C slave node. In yet other embodiments, the WWCD 104 implements a protocol other than I²C to communicate with computing device 108 and/or accessory device 110 via wired interface 212, such as SPI, 1-wire, or the like.

Figure 3:
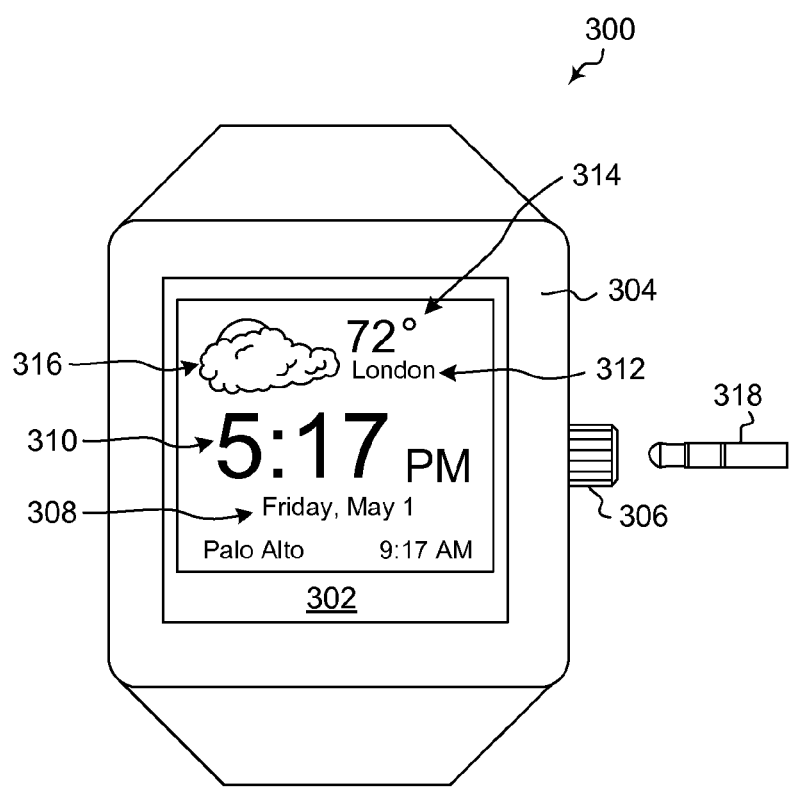
FIG. 3 illustrates an embodiment of a WWCD that may correspond to the WWCDs of FIGS. 1 and 2.

With additional reference to FIG. 3, one embodiment of a WWCD 300 is disclosed that may correspond to the WWCD 104 of FIGS. 1-2. As illustrated in FIG. 3, the WWCD 300 includes a display 302, a housing 304 and a crown 306. With combined reference to FIGS. 1 and 3, the display 302 displays content, some or all of which is obtained from services/resources 106 via network 102. For instance, the content displayed in display 302 includes date 308, time 310 and/or location 312 information which may be obtained from a GPS service 106. Alternately or additionally, the date 308, time 310 and/or location 312 information is initially configured/input by a user and maintained internally within WWCD 300. Alternately or additionally, the content includes temperature 314 and/or forecast 316 information associated with the location 312, which temperature 314 and/or forecast 316 information may be obtained from a weather service 106.

The date 308, time 310, location 312, temperature 314, and forecast 316 information are merely provided as examples of content that can be included in display 302. The embodiments disclosed herein are not limited to the specific content identified in association with FIG. 3 and can include virtually any content, some or all of which may be obtained from a service/resource 106. Alternately or additionally, content can be displayed on display 302 that is configured, input and/or selected by a user and/or received from a computing device 108.

In some embodiments, the display 302 is a touch-screen display that employs any suitable touch-screen technology, such as resistive touch-screen technology, surface acoustic wave technology, capacitive touch-screen display technology (including surface capacitive touch technology or projected capacitive touch technology), or the like or any combination thereof. In these and other examples, the display 302 operates as both an output device and an input device. Alternately or additionally, although not depicted in FIG. 3, the WWCD 300 includes one or more speakers, vibrating elements, or other output devices and/or one or more keys, buttons, track wheels, scroll balls, microphones or other input devices.

The housing 304 houses various components for operating the WWCD 300. For instance, the housing 304 may house one or more of an integrated circuit ("IC"), volatile and/or non-volatile memory, battery, speaker, microphone, vibrating element, antenna, or the like or any combination thereof.

The crown 306 is configured to removably secure the WWCD 300 to an accessory in some embodiments. Alternately or additionally, the crown 306 includes an audio jack plug permitting the WWCD 300 to interface with an audio jack 318.

III. Brand Identity

As already mentioned above, and with combined reference to FIGS. 1-2, one or both of the WWCD 104 or accessory device 110 is associated with a particular brand identity and the level of interaction of one or both of the WWCD 104 or accessory device 110 varies depending on compatibility between the particular brand identity, if any, associated with WWCD 104 and/or accessory device 110. The term "brand identity" should be construed broadly to include any brand, sub-brand, or other identifier that indicates that the WWCD 104 or accessory device 110 is associated with a particular entity that owns or otherwise has rights to use the brand identity.

Each of the WWCD 104 and accessory device 110 can be branded—e.g., associated with a particular brand identity—or unbranded—e.g., not associated with a particular brand identity. Additionally, branded accessory devices 110 can be smart or standard accessory devices 110. A smart accessory device 110 is an accessory device 110 that can transfer its brand identity, and more particularly, a logo or other brand attribute associated with the brand identity, to an unbranded WWCD 104. In contrast, a standard accessory device 110 is an accessory device 110 that cannot transfer its brand identity to a WWCD 104.

Figure 4A:
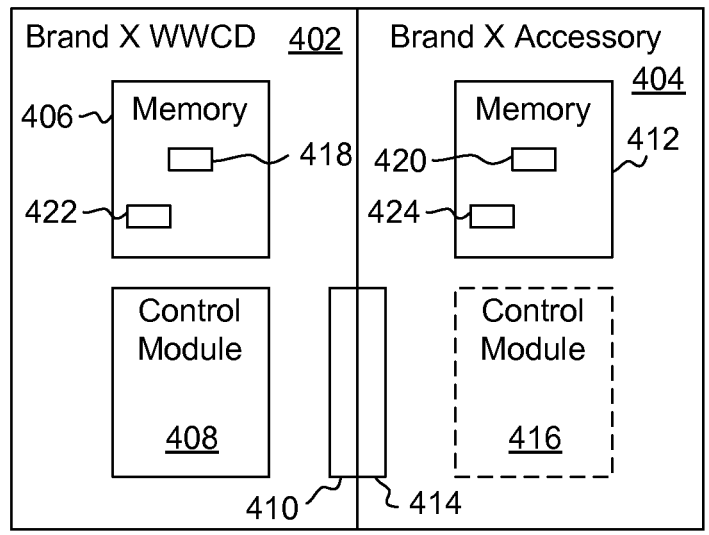
FIG. 4A illustrates a branded WWCD interacting with an identically or compatibly branded accessory device.

In some embodiments, both of the WWCD 104 and accessory device 110 are associated with the same brand identity. For instance, FIG. 4A discloses a WWCD 402 and accessory device 404 that are both associated with the same brand identity, Brand X. As illustrated in FIG. 4A, the WWCD 402 includes at least a memory 406, control module 408 and wired interface 410. Although not illustrated in FIG. 4A, the WWCD 402 may further include a user interface, power supply, or other components. Alternately or additionally, the accessory device 404 includes a memory 412, a wired interface 414 and an optional control module 416.

In the illustrated embodiment, the wired interfaces 410, 414 are complementary to one another such that the WWCD 402 and accessory device 404 can communicate with each other via the wired interfaces 410, 414.

In some embodiments, brand data 418, 420 indicating an associated brand identity of the WWCD 402 and accessory device 404 is stored in each of the WWCD 402 and accessory device 404. In particular, in the example of FIG. 4A, the brand data 418, 420 is stored in memory 406, 412, respectively. In some embodiments, the brand data 418, 420 is stored in a memory location designated for storing brand data. Alternately or additionally, in the example of FIG. 4A, brand data 418, 420 indicates that each of the WWCD 402 and accessory device 404 is associated with Brand X. Optionally, the brand data 418, 420 may further include a logo or other brand identifier associated with Brand X that is displayed in a user interface of WWCD 402 or accessory device 404 in some embodiments.

Alternately or additionally, interoperability data 422, 424 is stored in memory 406, 412. The interoperability data 422, 424 defines levels of interaction of each of the WWCD 402 or accessory device 404 under combinations of the WWCD 402 or accessory device 404 with a corresponding accessory device or WWCD in different brand identity scenarios. The different brand identity scenarios in some embodiments include a branded WWCD 402 with an identically or compatibly branded accessory device 404 (FIG. 4A), a branded WWCD 402 with an un-branded or incompatibly branded accessory device 404A (FIG. 4B), an un-branded WWCD 402A with a branded accessory device 404 (FIG. 4C), and an un-branded WWCD 402A with an un-branded accessory device 404A (FIG. 4D).

The interoperability data 422, 424 defines a first level of interaction for each of the WWCD 402 and accessory device 404 where both of the WWCD 402 and accessory device 404 are associated with Brand X (or with compatible brand identities) as in the example of FIG. 4A. Alternately or additionally, the interoperability data 422 of WWCD 402 defines a second level of interaction for the WWCD 402 that is less extensive than the first level of interaction for the WWCD 402 where the accessory device 404A is un-branded or incompatibly branded with the WWCD 402 as in the example of FIG. 4B. Alternately or additionally, the interoperability data 424 of accessory device 404 defines a second level of interaction for the accessory device 404 that is less extensive than the first level of interaction for the accessory device 404 where the WWCD 402A is un-branded as in the example of FIG. 4C. The first and second levels of interaction defined for the WWCD 402 by interoperability data 422 may be divided into additional levels depending on the type of accessory device 404 (e.g., charging dock, clock radio, television, watch band, etc.) with which the WWCD 402 interacts. In some embodiments, the interoperability data 422, 424 is configured in the factory in each of the WWCD 402 and accessory device 404 by the owner or administrator of the associated brand identity.

In the example of FIG. 4A and other examples described herein, after the WWCD 402 is connected to accessory device 404, the control module 408 of WWCD 402 may query the memory 412 of accessory device 404 (via wired interfaces 410, 414) for any brand data, such as brand data 420, indicating the associated brand identity of the accessory device 404. After receiving the brand data 420 of accessory device 404, the control module 408 determines the brand identity associated with the accessory device 404 and then determines the level of interaction of the WWCD 402 with the accessory device 404 based on the brand identity associated with the accessory device 404.

Alternately or additionally, the control module 416 of accessory device 404 may query the memory 406 of WWCD 402 for any brand data, such as brand data 418, indicating the associated brand identity of WWCD 402. After receiving the brand data 418 of WWCD 402, the control module 416 determines the brand identity associated with the WWCD 402 and then determines the level of interaction of the accessory device 404 with the WWCD 402 based on the brand identity associated with the WWCD 402.

In the example of FIG. 4A, both of WWCD 402 and accessory device 404 are associated with Brand X (or with compatible brand identities). As such, the interoperability data 422 of WWCD 402 defines a first level of interaction of the WWCD 402 with the accessory device 404 that may include at least displaying a logo or other brand attribute of Brand X on a display of the WWCD 402.

The interoperability data 422 of WWCD 402 may alternately or additionally permit the WWCD 402 to become subordinate to the accessory device 404. In particular, the interoperability data 422 of WWCD 402 may permit the accessory device 404 to master a display of the WWCD 402 and/or to use the WWCD 402 as a modem.

Figure 4B:
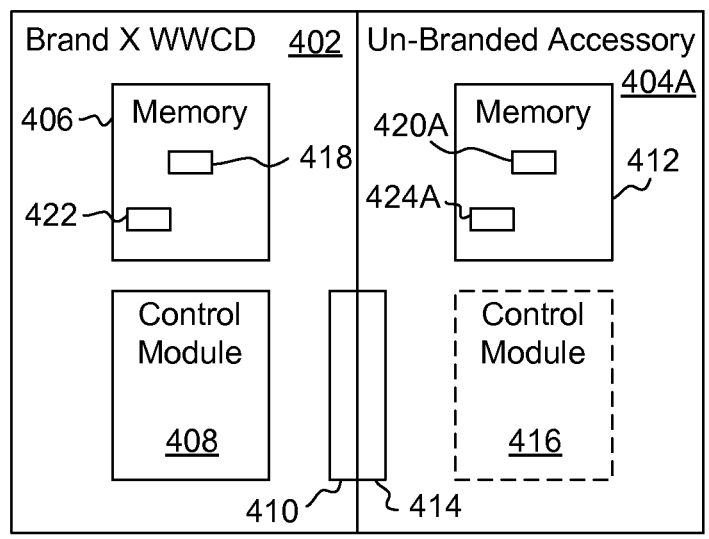
FIG. 4B illustrates a branded WWCD interacting with an un-branded or incompatibly branded accessory device.

In the example of FIG. 4B, the WWCD 402 is associated with Brand X while the accessory device 404A is un-branded, or is associated with an incompatible brand identity as indicated by brand data 420A. As such, the interoperability data 422 of WWCD 402 defines a second level of interaction of the WWCD 402 with the accessory device 404A that may include completely disabling the WWCD 402, or not displaying a logo or other brand attribute of Brand X on a display of the WWCD 402. The interoperability data 422 of WWCD 402 may alternately or additionally otherwise reduce the functionality of WWCD 402 including, for example, not permitting the accessory device 404A to master a display of the WWCD 402 and/or to use the WWCD 402 as a modem.

In some embodiments, the accessory device 404A lacks any sort of electronic function. For instance, the accessory device 404A may be a device holder such as a watch band. In these and other embodiments, the interoperability data 422 of WWCD 402 permits the WWCD 402 to continue displaying the brand attribute of Brand X on a display of the WWCD 402, but stores data or sets a flag indicating that the WWCD 402 is connected with an un-branded (or incompatibly branded) accessory device 404A in memory 406. At a later time when the WWCD 402 is connected to services/resources 106A-106N via computing device 108 and/or network 102, the data or flag indicating that the WWCD 402 was connected with an un-branded (or incompatibly branded) accessory device 404A is read from memory 406 by services/resources 106A-106N and/or computing device 108 and a notice is generated for the user of WWCD 402 suggesting that the user use the WWCD 402 with branded accessory devices and/or suggesting branded accessory devices associated with one or more particular brand identities to the user for purchase. For instance, the notice may suggest that the user use the WWCD 402 with branded accessory devices that are associated with the same brand identity as the WWCD 402, e.g., Brand X and/or with branded accessory devices that are associated one or more compatible or affiliated brand identities.

Figure 4C:
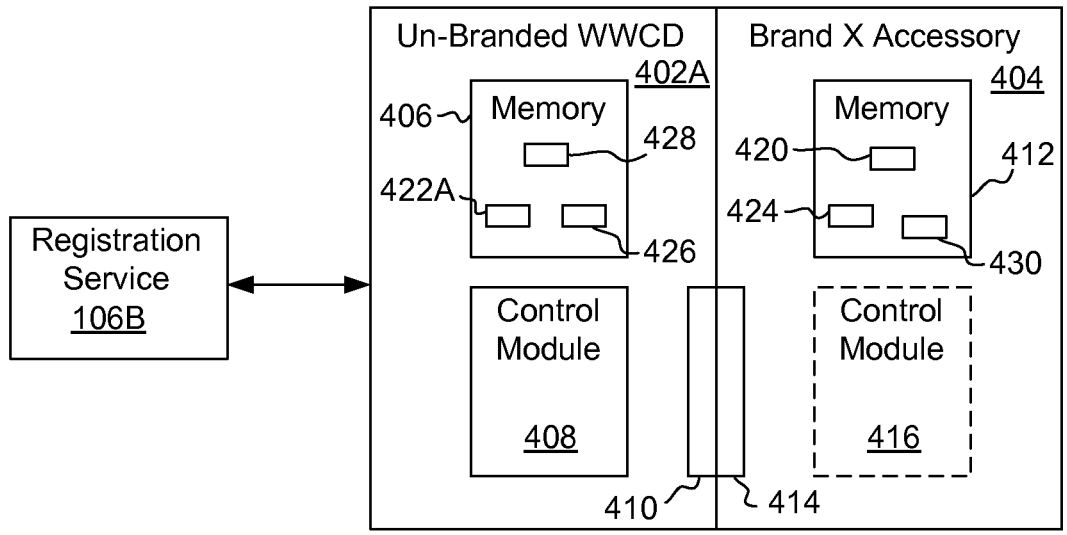
FIG. 4C illustrates an un-branded WWCD interacting with a branded accessory device.
Figure 4D:
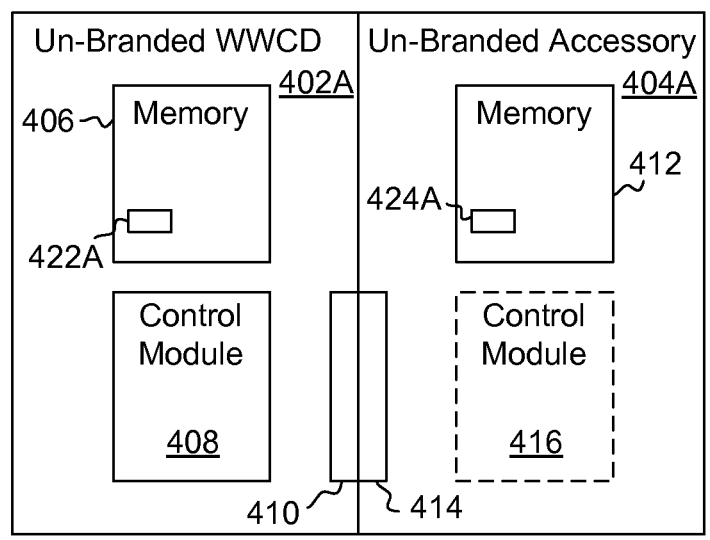
FIG. 4D illustrates an un-branded WWCD interacting with an un-branded accessory device.

In the example of FIG. 4C, the WWCD 402A is un-branded (or is brand neutral) while the accessory device 404 is associated with Brand X. The WWCD 402A may include interoperability data 422A that permits the WWCD 402A to temporarily adopt the brand identity of the accessory device 404 while the two are connected to each other. Alternately or additionally, the interoperability data 424 of accessory device 404 may instruct the accessory device 404 to transfer a logo or other brand attribute from memory 412 of accessory device 404 to the WWCD 402A. In this and other examples, the logo or other brand attribute of accessory device 404 may be included in brand data 420 of accessory device 404. Upon receiving the logo or other brand attribute from the accessory device 404, the WWCD 402A displays the logo or other brand attribute on the display of WWCD 402A.

In the example of FIG. 4D, both of the WWCD 402A and accessory device 404A are un-branded. Nevertheless, one of both of the WWCD 402A and accessory device 404A may include interoperability data 422A, 424A defining the level of interaction of the WWCD 402A and/or accessory device 404A with each other.

In the examples of FIGS. 4A-4D the level of interaction permitted between the WWCD 402, 402A with the accessory device 404, 404A is defined by interoperability data 422, 422A of the WWCD 402, 402A and/or interoperability data 424, 424A of the accessory device 404, 404A, which is then implemented by one or both of control modules 408, 416.

While the level of interaction permitted has been described as being dependent on compatibility between brand identities, if any, of the WWCD 402, 402A and/or accessory device 404, 404A, the level of interaction permitted may alternately or additionally depend on the type of accessory device 404, 404A to which the WWCD 402, 402A is connected. For instance, the level of interaction permitted between the WWCD 402, 402A and accessory device 404, 404A may depend on whether the accessory device 404, 404A is a charging dock, clock radio, television, watch band, clip-on-band, etc. Type data (not shown) may be stored in memory 412 of the accessory device 404 or 404A indicating a type of the accessory device 404 or 404A. Alternately or additionally, type data can be included in brand data 420 or 420A.

Generally, a branded WWCD 402 determines the level of interaction with a branded accessory device 404 or an unbranded accessory device 404A as in the examples of FIGS. 4A-4B. Alternately or additionally, a branded smart accessory device, such as the accessory device 404, determines the level of interaction when the accessory device 404 is connected to an unbranded WWCD 402A, as in the example of FIG. 4C. The accessory device 404 determining the level of interaction with unbranded WWCD 402A in some embodiments ensures the integrity of the brand identity of the accessory device 404.

For instance, in some embodiments, the interactions permitted by the accessory device 404 may include transferring a logo or other brand attribute associated with the brand identity of accessory device 404 from the accessory device 404 to the WWCD 402A. If multiple users, each having an unbranded WWCD 402A, were able to connect to the accessory device 404 and receive and indefinitely display the logo or other brand attribute of the accessory device 404 on the display of each of the WWCDs 402A, the value of the logo or other brand attribute would become diluted. While some embodiments described herein allow this scenario to occur, other embodiments include the accessory device 404 determining the level of interaction on a WWCD-by-WWCD basis. In particular, the interoperability data 424 of the accessory device 404 may permit transfer of the logo or other brand attribute to a limited number of unbranded WWCDs 402A and/or for a limited amount of time.

To determine whether to transfer its brand attribute to a WWCD 402A, the accessory device 404 in some embodiments first validates the identity of the WWCD 402A. Validating the identity of the WWCD 402A may include the accessory device 404 providing the WWCD 402A with an input on which the WWCD 402A performs a cryptographic function. For instance, in this example, the control module 416 of accessory device 416 generates and provides the WWCD 402A a random or pseudo-random data string. The control module 408 of WWCD 402A then generates an output by performing a cryptographic function, such as a signature, on the data string and/or a unique serial number 426 of the WWCD 402A using a public key 428 corresponding to a private key 430 of the accessory device 404. The output is returned to the accessory device 404, which uses the private key 430 to determine the unique serial number 426 of the WWCD 402A.

In some embodiments, validation by the accessory device 404 ensures that software on the WWCD 402A has not been compromised such that usage restrictions will be respected. Upon validation, the accessory device 404 may transfer a logo or other brand attribute to the WWCD 402A for display on a display of the WWCD 402A. The transfer of the logo or other brand attribute is accompanied by usage restrictions in some embodiments. The usage restrictions specify a duration for displaying the logo or other brand attribute on the WWCD 402A. The duration may be only as long as the WWCD 402A is connected to the accessory device 404, a predetermined amount of time after the WWCD 402A is disconnected from the accessory device 404, and/or contingent upon the WWCD 402A contacting a particular one of services 106A-106N and performing a predetermined operation. The connection between the WWCD 402A and accessory device 404 may be a physical connection or a logical connection (e.g., wireless).

In some embodiments, the WWCD 402A contacts a registration service 106B from among the services/resources 106A-106N during or as a part of the validation process. In these and other embodiments, the WWCD 402A acts as a communication proxy, enabling the accessory device 404 to communicate with the registration service 106B to guarantee that the registration service 106B has knowledge of the identity of the WWCD 402A. In this regard, the WWCD 402A may send the data string from the accessory device 404, a unique serial number for the accessory device 404, and/or the unique serial number 426 of the WWCD 402A, to the registration service 106B, whereupon the registration service 106B establishes a pairing between the WWCD 402A and accessory device 404 based on serial numbers. Optionally, the registration service 106B may perform a cryptographic function on the input received from the WWCD 402A and return the output to the WWCD 402A and then the accessory device 404 for validation.

Alternately or additionally, the registration service 106B may already include a pairing of the accessory device 404 with another WWCD 402A. In this case, the registration service 106B may provide a response indicating this to the accessory device 404 such that the accessory device 404 can take appropriate action, e.g., terminating the transfer of its logo or other brand attribute to the WWCD 402A, disabling its own functionality, or the like.

In the case where the accessory device 404 is already paired with another WWCD 402A, the response from the registration service 106B may cause the WWCD 402A to query the user regarding whether the user would like to create a new pairing and terminate the previous pairing. The registration service 106B may impose limitations on the frequency and/or number of pairings that can be created and/or terminated. In this manner, accessory devices 404 can be given as gifts, sold, or otherwise transferred to new users on a permanent basis and paired with new WWCDs 402A despite a previous pairing while substantially preventing users from gaming the system.

The foregoing example has been described in the context of the registration service 106B receiving input from the WWCD 402A and creating a pairing between the WWCD 402A and accessory device 404. Alternately or additionally, the registration service 106B may push the input received from the WWCD 402A to an authentication server owned or otherwise associated with the owner of the brand identity of accessory device 404 for pairing of the accessory device 404 with the WWCD 402A.

In some embodiments, the owners of the different brand identities with which one or both of the WWCD 402 and accessory device 404 are associated have one or more sub-brands within the brand identity. For instance, consider an example entity that manufacturers watches and/or watch bands (referred to herein as the "watchmaker entity") and owns a brand identity referred to herein as WATCH brand. In this example, the watchmaker entity manufacturers branded accessory devices 404 that are watch bands for use with WWCDs 402, 402A, which watch bands may be grouped into one or more sub-brands within the WATCH brand. For instance, one watch band may belong to a sports sub-brand and have a sportier look, while another watch band may belong to a dress sub-brand and have a dressier look.

The different sub-brands of the watch bands are identifiable in some embodiments by brand data 420 within memory 412 of each watch band. Depending on, among other things, whether the WWCD 402, 402A is connected to a dress watch band or a sports watch band, the display of the WWCD 402, 402A may differ. For instance, the display of WWCD 402, 402A may initiate a dress mode when connected to the dress watch band, and a sport mode when connected to the sport watch band.

The concept of sub-brands broadly includes the capabilities, hardware, software, sub-brand, or other features that a brand owner implements in a particular branded WWCD 402 or accessory device 404. In some embodiments, such features are identified in the brand data 418, 420 included in the memory 406, 412 of the branded WWCD 402 or accessory device 404. Accordingly, the ability to determine levels of interaction between WWCDs 402, 402A and accessory devices 404, 404A according to interoperability between respective brand identities (including sub-brands) allows the brand owners to precisely define how the WWCDs 402, 402A or accessory devices 404, 404A they manufacture can interact with each other including the ability to tie particular features together. For instance, a brand owner can tie software on a WWCD 402 or accessory device 404 to particular capabilities, software, hardware, brand, and/or other features of a corresponding accessory device 404, 404A or WWCD 402, 402A. More generally, the embodiments described herein allow a brand owner to tie any one or more of capabilities, software, hardware, brand, or other features on a WWCD 402 or accessory device 404 to particular capabilities, software, hardware, brand, and/or other features of a corresponding accessory device 404, 404A or WWCD 402, 402A.

IV. Accessory Device Authentication

Figure 5:
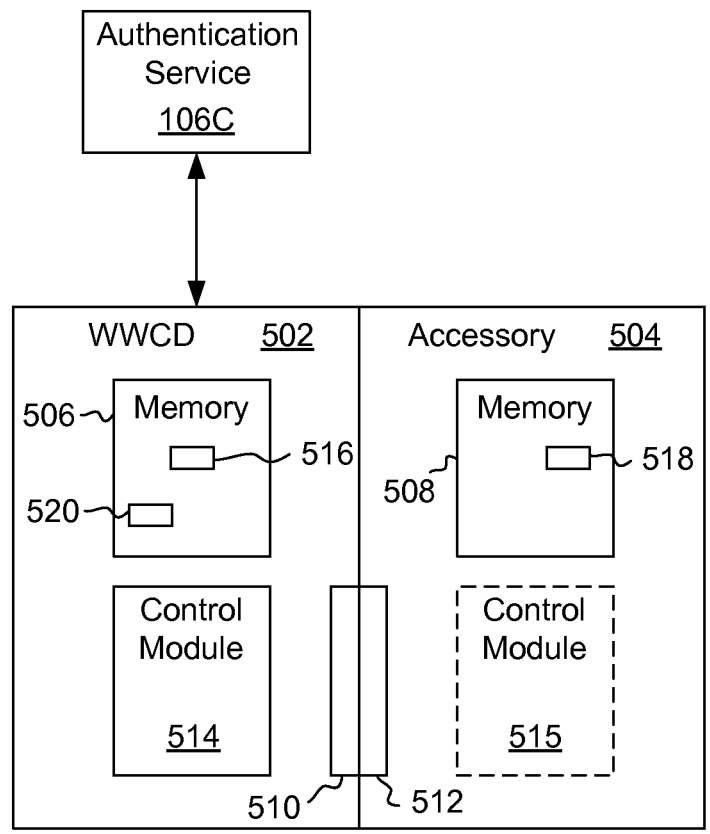
FIG. 5 depicts a WWCD configured to authenticate an accessory device.

Some embodiments disclosed herein implement accessory device authentication. For instance, FIG. 5 discloses a WWCD 502 and accessory device 504, each of which includes a memory 506, 508 and a wired interface 510, 512. The WWCD 502 further includes a control module 514. Optionally, the accessory device 504 includes a control module 515 as well. The memory 506 of WWCD 502 includes a first cryptographic key 516. The memory 508 of accessory device 504 includes a signed serial number 518 signed using a second cryptographic key that is complementary to the first cryptographic key 516. In some embodiments, the first cryptographic key 516 and second cryptographic key are a private/public key pair implemented in a public key infrastructure ("PKI") scheme.

According to some embodiments, when the WWCD 502 and accessory device 504 are connected to each other, the control module 514 of WWCD 502 accesses a predetermined location in memory 508 of accessory device 504 and retrieves the data stored therein. In the present example, the data includes the signed serial number 518. The control module 514 of WWCD 502 then uses the first cryptographic key 516 to decrypt the data including the signed serial number 518 to determine a corresponding un-signed serial number for the accessory device 504, which the control module 514 of WWCD 502 may store in memory 506 as decryption data 520. In this example, the WWCD 502 authenticates the accessory device 504 if the control module 514 is able to decrypt the signed serial number 518 using the first cryptographic key 516 to produce decryption data 520 including an un-signed serial number.

In some embodiments, if the accessory device 504 lacks any data at the location accessed by the control module 514, if the WWCD 502 is unable to decrypt the data using first cryptographic key 516 and/or if the output of decryption using first cryptographic key 516 results in data that is not a known serial number (based on a predetermined numbering scheme for accessory devices) for any authorized accessory device 504, the accessory device 504 is not authenticated by the control module 514 and the control module 514 may respond accordingly. For instance, the control module 514 may disable functionality of the WWCD 502 in connection with the accessory device 504, may remain functional but reduce the level of interaction between the WWCD 502 and accessory device 504 such as by terminating the transfer of a logo or other brand attribute associated with a brand identity of the WWCD 502 to the accessory device 504, may notify a user of the WWCD 502 that the accessory device 504 cannot be authenticated, or take some other action.

Alternately or additionally, the control module 514 stores the decryption data 520 in memory 506 and, when a network connection is established with a authentication service 106C, the authentication service 106C checks the decryption data 520 against a database of known accessory device serial numbers to determine whether accessory device 504 is a counterfeit. If the accessory device 504 is determined to be a counterfeit, the authentication service 106C may notify the WWCD 502 so as to disable and/or reduce the functionality of the WWCD 502 when used in connection with accessory device 504. Alternately or additionally, the authentication service 106C may notify the user of WWCD 502 that the accessory device 504 is a counterfeit or take some other action.

Instead of checking the decryption data 520 against a database of known accessory device serial numbers, the authentication service 106C may alternately establish a pairing between the WWCD 502 and accessory device 504 based on serial numbers. In this example, upon receiving decryption data 520, the authentication service 106C checks the decryption data 520 against a database of established pairings to determine whether the serial number of the accessory device 504 has already been paired with the WWCD 502 or some other WWCD 502, which may indicate that the signed serial number 518 has been copied into one or more clone accessory devices. Upon determining that the serial number of accessory device 504 has already been paired with at least one other WWCD 502, the authentication service 106C may instruct the WWCD 502 to de-authenticate the accessory device 504, whereupon the control module 514 of WWCD 502 responds accordingly. For instance, the control module 514 may disable functionality of the WWCD 502 in connection with the accessory device 504, may remain functional but reduce the level of interaction between the WWCD 502 and accessory device 504 such as by terminating the transfer of a logo or other brand attribute associated with a brand identity of the WWCD 502 to the accessory device 504, may notify a user of the WWCD 502 that the accessory device 504 has been de-authenticated, or take some other action.

V. Example Methods of Operation

Figure 6:
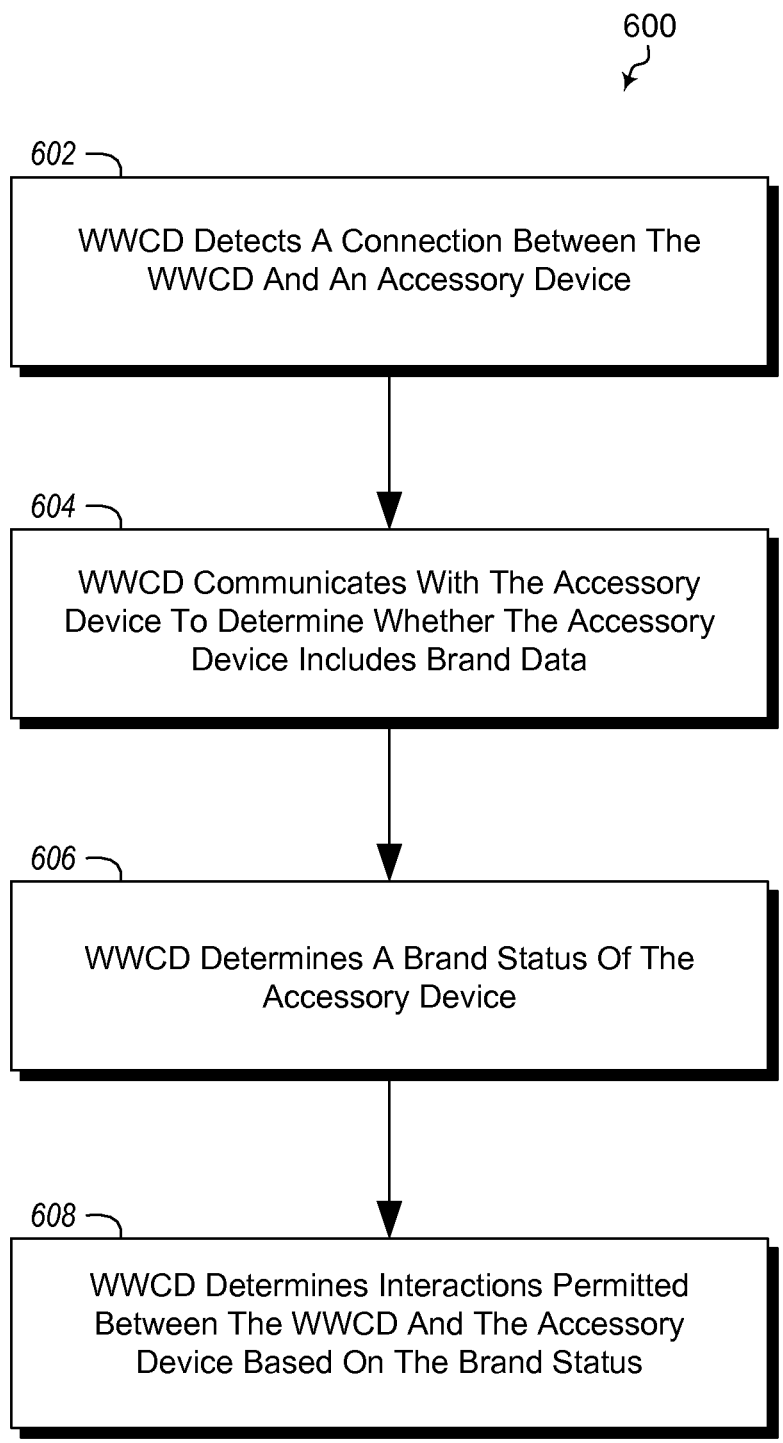
FIG. 6 is a flowchart of a method for determining the functionality of a WWCD based on compatibility of the brand identities, if any, associated with the WWCD and an accessory device.

Turning next to FIG. 6, an example method 600 of determining the functionality of a WWCD is disclosed. The method 600 may be performed in some embodiments by the WWCDs 104, 300, 402, 402A, 502 of FIGS. 1-5. For simplicity, the method 600 will be discussed in the context of FIGS. 4A-4D. The method 600 begins after the WWCD 402 or 402A is inserted into or otherwise connected to accessory device 404 or 404A. At 602, the WWCD 402 or 402A detects a connection between WWCD 402 or 402A and accessory device 404 or 404A.

At 604, the WWCD 402 or 402A communicates with the accessory device 404 or 404A to determine whether the accessory device 404 or 404A includes brand data indicating a brand identity associated with the accessory device 404 or 404A. In some embodiments, communicating with the accessory device 404 or 404A to determine whether the accessory device 404 or 404A includes brand data includes accessing a memory location in the memory 412 of accessory device 404 or 404A, wherein the memory location is designated for storing brand data indicating a brand identity associated with the accessory device 404 or 404A. Alternately or additionally, step 604 of method 600 includes communicating with the accessory device 404 or 404A using serial port communication, USB, I²C, wireless protocol(s), or the like or any combination thereof.

At 606, the WWCD 402 or 402A determines a brand status of the accessory device 404 or 404A based on the data, if any, accessed from the accessory device 404 or 404A. For instance, if the WWCD 402 or 402A receives brand data 420 or 420A after communication with the accessory device 404 or 404A at step 604, the accessory device 404 or 404A is determined to be branded at step 606. In contrast, if the WWCD 402 or 402A does not receive any brand data after communication with the accessory device 404 or 404A at step 604, the accessory device 404 or 404A is determined to be un-branded in some embodiments. Where the accessory device 404 or 404A includes brand data 420 or 420A, the step 606 of determining brand status of the accessory device 404 or 404A further includes identifying a brand identity associated with the accessory device 404 or 404A based on the brand data 420 or 420A.

At 608, the WWCD 402 or 402A determines one or more interactions permitted between the WWCD 402 or 402A and the accessory device 404 or 404A based at least in part on the brand status (including the brand identity, if any) of the accessory device 404 or 404A. Step 608 includes, in some embodiments, the control module 408 of WWCD 402 or 402A implementing interoperability data 422 or 422A that defines the permitted level of interactions of the WWCD 402 or 402A with the accessory device 404 or 404A. Alternately or additionally, the interactions permitted based on the brand status of accessory device 404 or 404A include one or more of: displaying a logo or other brand attribute of the accessory device 404 or 404A or WWCD 402 or 402A on the display of WWCD 402 or 402A, permitting the accessory device 404 or 404A to master the display of the WWCD 402 or 402A, permitting the accessory device 404 or 404A to use the WWCD 402 or 402A as a modem, disabling the WWCD 402 or 402A, permitting reduced or partial functionality of the WWCD 402 or 402A, setting a flag to notify a user of the WWCD 402 or 402A to use the WWCD 402 or 402A with branded accessory devices, the WWCD 402 or 402A temporarily adopting the brand identity of the accessory device 404 or 404A, including displaying a logo or other brand attribute of the brand identity associated with the accessory device on the display of WWCD 402 or 402A, or the like or any combination thereof.

The interactions determined to be permitted at step 608 have been described as being dependent at least in part on the brand status of the accessory device 404 or 404A. Alternately or additionally, the interactions determined to be permitted at step 608 are further dependent on a brand status (including the brand identity, if any) of the WWCD 402 or 402A, and/or the type of accessory device 404 or 404A to which the WWCD 402 or 402A is connected.

In some embodiments, the method 600 further includes the WWCD 402 or 402A determining a brand status of the WWCD 402 or 402A, including determining a brand identity associated with the WWCD 402 or 402A when the WWCD 402 or 402A is branded.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
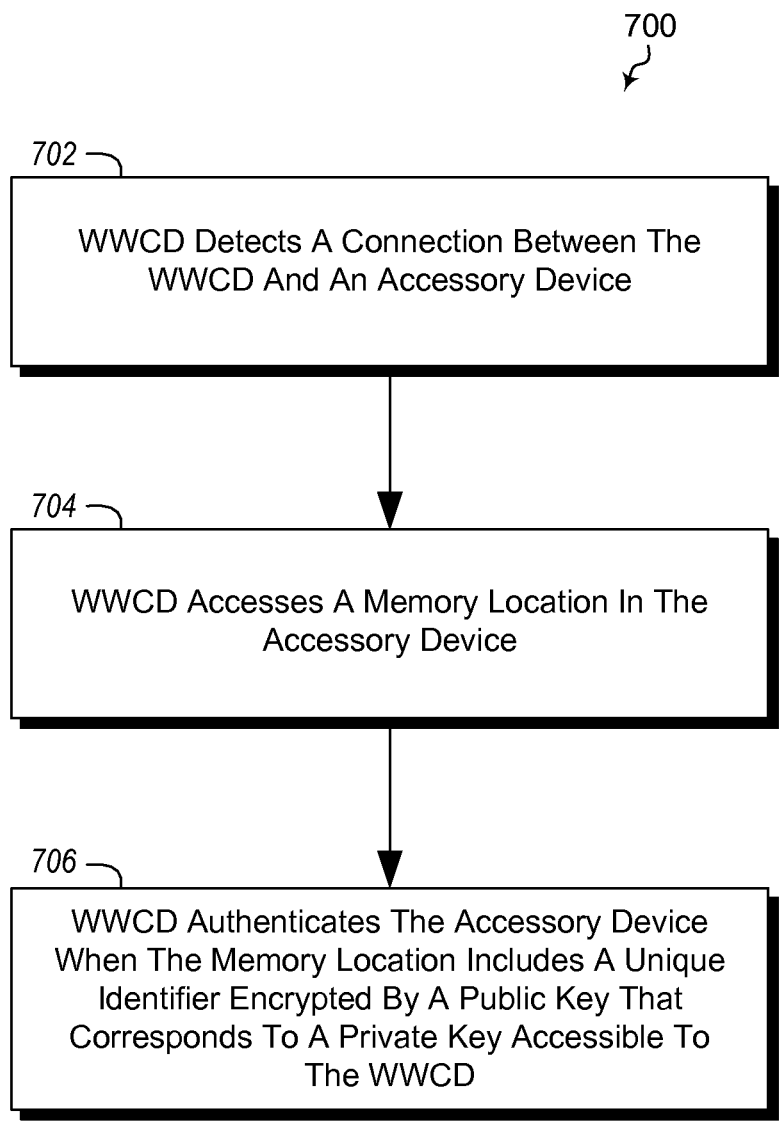
FIG. 7 is a flowchart of a method for detecting whether an accessory device is authorized for use with a WWCD.

Turning next to FIG. 7, an example method 700 of detecting whether an accessory device is authorized for a WWCD is disclosed. The method 700 may be performed in some embodiments by the WWCDs 104, 300, 402, 402A, 502 of FIGS. 1-5. For simplicity, the method 700 will be discussed in the context of FIG. 5. The method 700 begins after the WWCD 502 is inserted into or otherwise connected to accessory device 504. At 702, the WWCD 502 detects a connection between WWCD 502 and accessory device 404.

At 704, the WWCD 502 accesses a memory location in the memory 508 of accessory device 504, wherein the memory location is designated for storing data used to authenticate the accessory. For instance, the memory location may be designated for storing a signed serial number 518.

At 706, the WWCD 502 authenticates the accessory device 504 when data stored in the memory location of memory 508 includes a unique identifier encrypted by a second cryptographic key, such as a public key, that corresponds to the first cryptographic key 516 (e.g., a private key) accessible to the WWCD 502. The step 706 of authenticating the accessory device 504 when data stored in the memory location of memory 508 includes a unique identifier encrypted by a second cryptographic key may include the WWCD 502 decrypting the signed serial number 518 using first cryptographic key 516 to produce decryption data 520.

In some embodiments, the method 700 further includes storing the decryption data 520 in memory 506 of the WWCD 502 and/or making the decryption data 520 accessible to a authentication service 106.

The methods 600 and 700 of FIGS. 6 and 7 may be performed separately or may be combined. For instance, with combined reference to FIGS. 4A-7, brand data 420 or 420A stored in memory 412 of accessory device 404 or 404A may be signed using the second cryptographic key such that the step 606 of determining a brand status of the accessory device 404 or 404A includes decrypting signed brand data 420 or 420A using the first cryptographic key 516. Alternately or additionally, data indicating a brand identity associated with the accessory device 404 or 404A may be appended to or included with a serial number that has been assigned to accessory device 404 or 404A, which serial number may be signed/encrypted as explained above with respect to FIG. 5.

In some embodiments, a predetermined serial numbering scheme can be implemented that implicitly identifies a brand identity associated with the accessory device 504 based on all or a portion of the serial number assigned to the accessory device 504. For instance, a first serial number prefix or suffix might be assigned to a first brand identity, while a second serial number prefix or suffix is assigned to a second brand identity, and so on. In this and other examples, the method 700 might further include steps analogous to steps 606 and 608 of FIG. 6. In particular, the method 700 might further include determining a brand status (including a brand identity, if any) of the accessory device 504 based on all or a portion (such as a prefix or suffix) of the decryption data 520 and determining the interactions permitted between the WWCD 502 and accessory device 504 based on the brand status (including brand identity, if any) of the accessory device 504.

Figure 8:
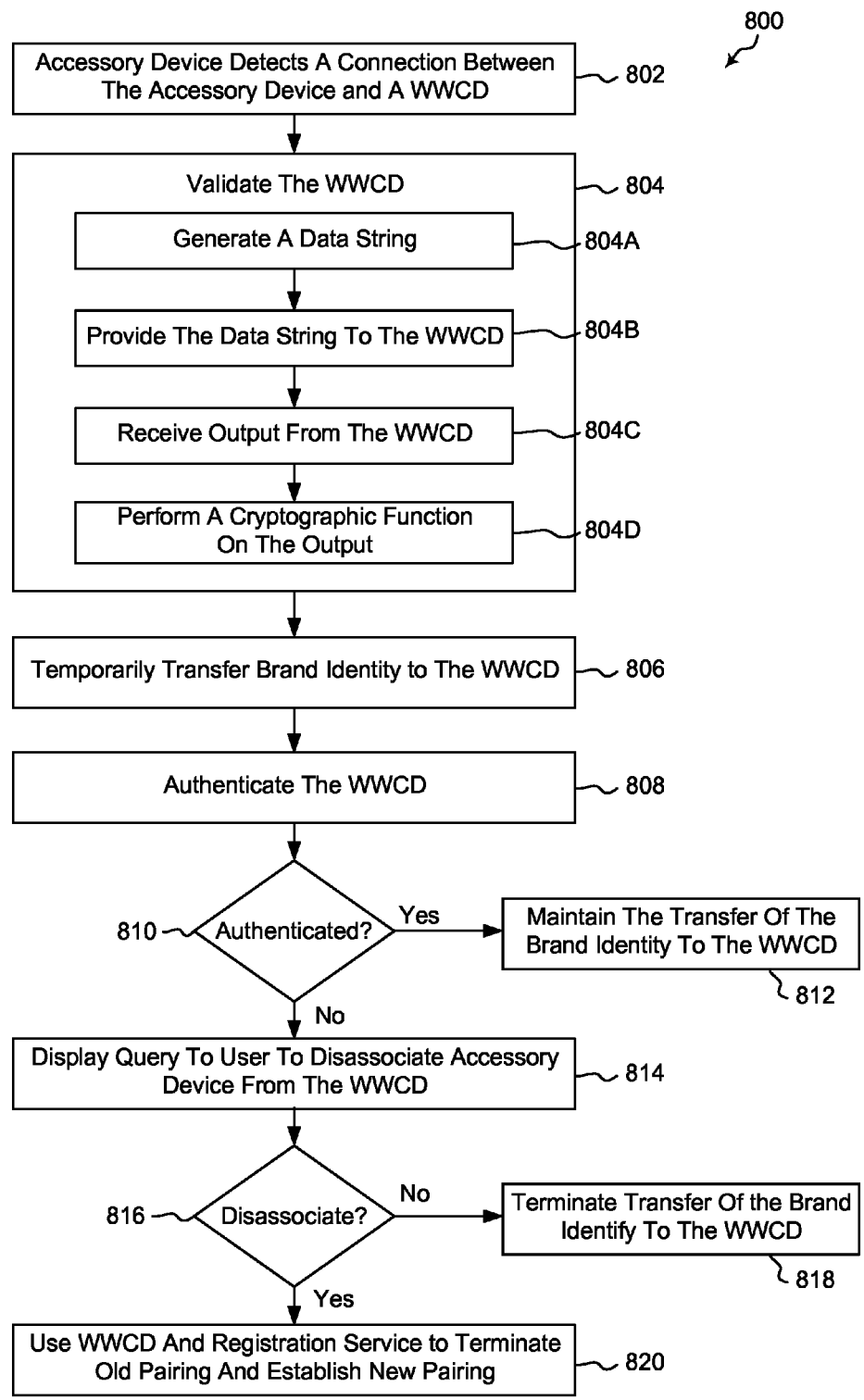
FIG. 8 is a flowchart of a method for transferring a brand identity of an accessory device to a WWCD.

Turning next to FIG. 8, an example method 800 of authenticating a WWCD is disclosed. The method 800 may be performed in some embodiments by the accessory devices 110, 404, 404A, 504 of FIGS. 1 and 4A-5 alone or in conjunction with one or more WWCDs, registration services and/or authentication servers. For simplicity, the method 800 will be discussed in the context of FIG. 4C. The method 800 begins after the WWCD 402A is inserted into or otherwise connected to accessory device 404. At 802, the accessory device 404 detects a connection between accessory device 404 and WWCD 402A.

Optionally, after detecting a connection, the accessory device 404 determines that the WWCD 402A is un-branded, whereupon the accessory device 404 performs one or more of the additional steps described herein.

At 804, the accessory device 404 validates the identity of the WWCD 402A. The step of validating 804 the identity of the WWCD 402A includes, in some embodiments, generating a random or pseudo random data string at 804A, providing the data string to the WWCD 402A at 804B, receiving an output from the WWCD 402A at 804C and performing a cryptographic function on the output at 804D. Performing 804D the cryptographic function on the output may include decrypting the output 804D using the private key 430. Alternately or additionally, validating 804 the identity of the WWCD 402A may further include saving a unique serial number for the WWCD 402A derived from the output into memory 412 of the accessory device 404.

In some embodiments, the output from the WWCD 402A is generated by the WWCD 402A performing a cryptographic function (such as a signature) on the data string and a unique serial number for the WWCD 402A using the public key 428 corresponding to the accessory device's 404 private key 430. Alternately or additionally, the WWCD 402A forwards the data string, the unique serial number for the WWCD 402A and/or a unique serial number for the accessory device 404 to the registration service 106B and the registration service 106B performs the cryptographic function on the data string and unique serial numbers for the WWCD 402A and accessory device 404 before returning the output to the WWCD 402A, which then forwards the output to accessory device 404. Alternately or additionally, an authentication server may be involved as well.

At 806, upon validating the WWCD 402A (e.g., upon determining the unique serial number for the WWCD 402A), the accessory device 404 temporarily transfers its brand identity to the WWCD 402A. Temporarily transferring brand identity may include, in some examples, temporarily transferring a logo or other brand attributed associated with the brand identity of the accessory device 404 to the WWCD 402A for display. Optionally, the transfer of the brand identity is accompanied by usage restrictions that define a duration for maintaining the transfer of the accessory device 404 brand identity to the WWCD 402A.

The usage restrictions can be defined as desired. For instance, the usage restrictions may maintain the transfer for as long as the WWCD 402A is connected to the accessory device 404. Alternately or additionally, the usage restrictions may permit the transfer to be maintained for as long as the WWCD 402A is connected to the accessory device 404 and for a predetermined time after disconnection. Alternately or additionally, the usage restrictions may include conditional restrictions, such as permitting the transfer to be maintained for a predetermined maximum amount of time with continued usage thereafter being conditioned on authentication of the WWCD 402A.

Accordingly, the method 800 in some embodiments further includes authenticating the WWCD 402A at 408. Authenticating the WWCD 402A in some examples includes the accessory device 404 receiving confirmation that the registration service 106B and/or an authentication server has knowledge of the identity of the WWCD 402A. In these and other examples, the WWCD 402A may act as a communication proxy enabling the accessory device 404 to communicate with the registration service 106B and/or an authentication server.

In particular, the accessory device 404 provides a random or pseudo-random data string (and optionally a unique serial number for the accessory device 404) to the WWCD 402A. This may be provided to the WWCD 402A as part of the validation process at 804. The WWCD 402A establishes communication with the registration service 106B and provides the data string and unique serial numbers for the accessory device 404 and the WWCD 402A to the registration service 106B.

The registration service 106B (or an authentication server) then determines whether a pairing between the accessory device 404 and WWCD 402A is permitted. A pairing is permitted if the accessory device 404 has not previously been paired with another WWCD or if a database accessible to the registration service 106B indicates that the accessory device 404 is already currently paired with the WWCD 402A. If the pairing is permitted, the registration service 106B creates a new pairing (or confirms a pre-existing pairing). The registration service 106B further performs a cryptographic function on the data string, unique serial number for the WWCD 402A and/or unique serial number for the accessory device 404 and provides the output as a response to the WWCD 402A, which then forwards the response to the accessory device 404. The accessory device 404 then receives the response and authenticates the WWCD 402A at 808. Accordingly, authenticating the WWCD 402A may include performing a cryptographic function on the response using the private key 430.

Optionally, the response itself serves as confirmation from the registration service 106B that the registration service 106B has knowledge of the identity of the WWCD 402A. Alternately or additionally, the response may include data indicating that the registration service 106B has knowledge of the identity of the WWCD 402A. Having knowledge of the identity of the WWCD 402A in some examples includes having a record of the pairing between the accessory device 404 and WWCD 402A.

In some cases, the registration service 106B determines that the pairing between the accessory device 404 and WWCD 402A is not permitted. A pairing is not permitted if the database accessible to the registration service 106B indicates that the accessory device 404 is currently paired with a different WWCD than WWCD 402A. In some embodiments, the registration service 106B then provides a response to the accessory device 404 through WWCD 402A indicating that the registration service 106B has no knowledge of the WWCD 402A. More particularly, the response indicates that the accessory device 404 is currently paired with a different WWCD.

In some embodiments, the accessory device 404 records the pairing between the accessory device 404 and WWCD 402A. In particular, the accessory device 404 stores the unique serial number of the WWCD 402A. In this manner, the accessory device 404 can repeatedly validate and authenticate the WWCD 402A against the serial number of the WWCD 402A stored on the accessory device 404 without requiring repeated contact with the registration service 106B.

Alternately or additionally, recording the pairing with the WWCD 402A permits the accessory device 404 to impose restrictions on different unbranded WWCDs that are subsequently connected to the accessory device 404. For instance, after connecting to a different unbranded WWCD having a different unique serial number than that stored by the accessory device 404 and validating the different unbranded WWCD, including receiving a unique serial number of the different unbranded WWCD, the accessory device 404 in this and other examples determines that the unique serial number of the different unbranded WWCD is different than the unique serial number of the WWCD 402A and thus the different unbranded WWCD is not currently paired with the accessory device 404. Upon making this determination, the accessory device 404 can place restrictions on the different unbranded WWCD. For instance, the accessory device 404 may prevent transfer of its brand identity to the different unbranded WWCD until establishing a connection with the registration service 106B and sorting out the pairing issue. After connecting with the registration service 106B, the accessory device 404 can then determine whether to continue preventing transfer of its brand identity to the different unbranded WWCD or terminate the previous pairing and initiate a new pairing with the different unbranded WWCD as explained below with respect to steps 810, 814, 816, 820.

Accordingly, at decision step 810, the accessory device 404 determines whether the WWCD 402A is authenticated based on the response received from the registration service 106B. If the WWCD 402A has been properly authenticated, the method 800 further includes the accessory device 404 maintaining 812 the transfer of its brand identity to the WWCD 402A according to any usage restrictions.

In some embodiments, if the WWCD 402A has not been properly authenticated, the accessory device 404 asks the user through WWCD 402A at 814 whether the user would like to disassociate the accessory device 404 from the previous WWCD with which the accessory device 404 was paired so as to create a pairing between the accessory device 404 and the WWCD 402A. Depending on the user's response determined at decision step 816, the accessory device 404 either terminates 818 the transfer of its brand identity to the WWCD 402A or uses the WWCD 402A functioning as a communication proxy and the registration service 106B to terminate the previous pairing and establish a new pairing between the accessory device 404 and WWCD 402A at 820.

Optionally, the registration service 106B may impose restrictions on the frequency and/or total number of times that old pairings can be terminated and new pairings can be established to allow accessory devices 404 to be given or sold to other users with different WWCDs 402A while preventing users from gaming the system.

In some embodiments, one or more of the steps of the method 800 include the accessory device using brand data 420 and/or interoperability data 424. For instance, in some embodiments, the interoperability data 424 includes usage restrictions. Alternately or additionally, the interoperability data 424 includes instructions for the accessory device 404 to perform one or more of the steps of the method 800.

Furthermore, while the methods 600 and 700 have been discussed in the context of being performed by one or more of the WWCDs 104, 300, 402, 402A, 502, the methods 600 and 700 can alternately or additionally be adapted to be performed by one or more of accessory devices 110, 404, 404A, 504. Accordingly, the methods 600, 700 and 800 of FIGS. 6-8 can be performed separately or in any combination as will be appreciated by one of skill in the art.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting a connection between a wearable wireless communication device and an accessory device, the wearable wireless communication device having a display;
   communicating with the accessory device to determine whether the accessory device includes brand data including a first brand identity and a first logo associated with the accessory device;
   determining a brand status of the accessory device based on the brand data accessed from the accessory device, including identifying the first brand identity associated with the accessory device based on the brand data; and
   determining one or more interactions permitted between the wearable wireless communication device and the accessory device wherein:
   a first set of interactions is determined to be permitted when the first brand identity is identical to or compatible with a second brand identity associated with the wearable wireless communication device, the first set of interactions including at least displaying the first logo or other brand attribute of the first brand identity on the display;

second set of interactions is determined to be permitted when the first brand identity is incompatible with the second brand identity associated with the wearable wireless communication device, the second set of interactions including at least one of disabling or reducing functionality of the wearable wireless communication device, and not displaying the first logo or other brand attribute of the first brand identity;

a third set of interactions is determined to be permitted when the accessory device lacks any electronic function, the third set of interactions including at least displaying a second logo or other brand attribute of the second brand identity associated with the wearable wireless communication device on the display; and a fourth set of interactions is determined to be permitted when the wearable wireless communication device is unbranded while the accessory device includes the first brand identity, the fourth set of interactions including requesting the first logo or other brand attribute of the first brand identity from the accessory device, and temporarily displaying the first logo on the display while the wearable communication device and accessory device are connected.

2. The method of claim 1, wherein the determination of the one or more interactions permitted between the wearable wireless communication device and the accessory device is further based at least in part on a type of the accessory device to which the wearable wireless communication device is connected.

3. The method of claim 2, wherein a type of the accessory device is at least one of a charging dock, a clock radio, a television, a watch band, a clip-on-band, a cellular phone, a smart phone, exercise equipment, a bike accessory, or a media player.

4. The method of claim 1, wherein the third set of interactions include:
setting a flag to notify a user of the wearable wireless communication device to use the wearable wireless communication device with branded accessory devices.

5. The method of claim 1, wherein a brand status of the accessory device is branded when the accessory device includes brand data or un-branded when the accessory device does not include brand data.

6. The method of claim 1, wherein the brand data is encrypted by a public key corresponding to a private key accessible to the wearable wireless communication device, the method further comprising decrypting the encrypted brand data using the private key.

7. The method of claim 6, wherein the brand data is included in a unique serial number assigned to the accessory device.

8. The method of claim 7, wherein the brand data is a predetermined prefix or suffix of the unique serial number, the predetermined prefix or suffix corresponding to the first brand identity.

9. The method of claim 1, further comprising determining whether the wearable wireless communication device is branded or un-branded, and when the wearable wireless communication device is branded, determining the second brand identity and a sub-brand identity associated with the wearable wireless communication device.

10. The method of claim 9, wherein when the wearable wireless communication device and the accessory device are both associated with the first brand identity or the sub-brand identity, the first set of interactions further include subordinating control of the wearable wireless communication device from the wearable wireless communication device to the accessory device.

11. The method of claim 10, wherein subordinating control of the wearable wireless communication device from the wearable wireless communication device to the accessory device includes allowing the accessory device to master a display of the wearable wireless communication device, allowing the accessory device to use the wearable wireless communication device as a modem, or both.

12. The method of claim 1, wherein the wearable wireless communication device is associated with the second brand identity and when the accessory device is un-branded or is associated with the first brand identity that is incompatible with the second brand identity, the second set of interactions further comprises presenting a suggestion on a display of the wearable wireless communication device to use the wearable wireless communication device with accessory devices associated with the first brand identity.

13. The method of claim 1, wherein the brand data, if any, accessed from the accessory device identifies one or more capabilities, hardware, or software of the accessory device.

14. The method of claim 1, wherein communicating with the accessory device to determine whether the accessory device includes brand data includes accessing a memory location in the accessory device, wherein the memory location is designated for storing the brand data.

* * * * *